(12) United States Patent
Wu

(10) Patent No.: US 7,772,799 B2
(45) Date of Patent: Aug. 10, 2010

(54) UNIVERSAL BATTERY MODULE AND CONTROLLER THEREFOR

(75) Inventor: Deping Wu, British Columbia (CA)

(73) Assignee: Delaware Power Systems Corp., Richmond (CA)

( * ) Notice: Subject to any disclaimer, the term of this patent is extended or adjusted under 35 U.S.C. 154(b) by 0 days.

(21) Appl. No.: 11/348,056

(22) Filed: Feb. 6, 2006

(65) Prior Publication Data

US 2007/0080662 A1   Apr. 12, 2007

(30) Foreign Application Priority Data

Oct. 11, 2005   (CA)   ................................. 2523240

(51) Int. Cl.
    *H02J 7/14*   (2006.01)
(52) U.S. Cl. ...................... 320/104; 320/106
(58) Field of Classification Search ................. 320/109, 320/110, 112, 113, 104, 106, 107; 903/907, 903/903
    See application file for complete search history.

(56) References Cited

U.S. PATENT DOCUMENTS

| | | | |
|---|---|---|---|
| 5,422,558 A * | 6/1995 | Stewart | ...................... 320/120 |
| 5,498,950 A | 3/1996 | Ouwerkerk | |
| 5,619,417 A | 4/1997 | Kendall | |
| 5,670,861 A | 9/1997 | Nor | |
| 5,701,068 A | 12/1997 | Baer et al. | |
| 5,773,962 A | 6/1998 | Nor | |
| 5,821,734 A | 10/1998 | Faulk | |
| 5,892,351 A | 4/1999 | Faulk | |
| 5,929,606 A | 7/1999 | Faulk | |
| 5,945,806 A | 8/1999 | Faulk | |
| 5,945,807 A | 8/1999 | Faulk | |
| 6,064,178 A | 5/2000 | Miller | |
| 6,104,967 A | 8/2000 | Hagen et al. | |
| 6,184,656 B1 | 2/2001 | Karunasiri | |
| 6,222,344 B1 | 4/2001 | Peterson et al. | |
| 6,232,743 B1 * | 5/2001 | Nakanishi | ...................... 320/104 |
| 6,442,494 B1 | 8/2002 | Baalu et al. | |
| 6,472,098 B1 | 10/2002 | Sawada et al. | |
| 6,479,185 B1 | 11/2002 | Hilderbrand et al. | |
| 6,677,759 B2 | 1/2004 | Friel et al. | |
| 6,771,045 B1 | 8/2004 | Keller | |
| 6,793,027 B1 | 9/2004 | Yamada et al. | |
| 6,841,291 B2 | 1/2005 | Minamiura | |
| 6,882,129 B2 | 4/2005 | Boskovitch | |
| 7,615,966 B2 * | 11/2009 | Houldsworth et al. | ........ 320/132 |
| 2003/0118898 A1 * | 6/2003 | Kimura et al. | ............... 429/156 |
| 2004/0164706 A1 | 8/2004 | Osborne | |
| 2004/0212342 A1 | 10/2004 | Batson | |

(Continued)

FOREIGN PATENT DOCUMENTS

EP   1 462 299 A1   9/2004

(Continued)

*Primary Examiner*—Bao Q Vu
*Assistant Examiner*—Nguyen Tran
(74) *Attorney, Agent, or Firm*—Saliwanchik, Lloyd & Saliwanchik

(57) ABSTRACT

A battery pack is provided including universal battery modules and a master control module. By selecting proper rated universal battery modules and connecting them either in series and/or parallel, a high performance and long life battery pack is assembled that is suitable for high power applications such as electrical vehicles whereby the master control module acts as the battery pack control and interface module.

18 Claims, 12 Drawing Sheets

U.S. PATENT DOCUMENTS

| | | | |
|---|---|---|---|
| 2004/0257041 A1* | 12/2004 | Nagaoka | 320/128 |
| 2004/0264387 A1* | 12/2004 | Gibeau | 370/254 |
| 2005/0077874 A1 | 4/2005 | Nakao | |
| 2005/0089750 A1 | 4/2005 | Ng et al. | |
| 2006/0006841 A1* | 1/2006 | Lee | 320/116 |
| 2006/0033473 A1* | 2/2006 | Stanzel et al. | 320/128 |
| 2006/0076923 A1* | 4/2006 | Eaves | 320/112 |
| 2006/0103346 A1* | 5/2006 | Misu et al. | 320/107 |
| 2007/0017666 A1* | 1/2007 | Goenka et al. | 165/202 |

FOREIGN PATENT DOCUMENTS

| | | |
|---|---|---|
| WO | WO 03/071616 | 8/2003 |

* cited by examiner

UNIVERSAL BATTERY MODULE AND CONTROLLER THEREFOR

FIELD OF THE INVENTION

The present invention pertains to energy storage devices, and more particularly, to battery modules and controller therefor.

BACKGROUND

With the advent of high power, high performance electric drive technology, transportation vehicles are increasingly being moved from the combustion engine platform to electric propulsion systems. Not only electric vehicles are more power efficient and robust due to their lesser number of internal components, but also they produce little or no environmentally harmful emissions associated with the ignition of fossil fuels in combustion engines.

High power battery packs are the key components for the successful implementation of electric drive technology in transportation vehicles. The battery pack is the main source of power for the pure electric propulsion system and comprises a plurality of series or parallel-connected cells. Initially, battery packs including a number of acid-lead cells were employed. The acid-lead cells were electrically coupled in series to one another to provide sufficient power for the electrical drive mechanism of the early electric vehicles. However, these early battery packs were quite bulky and heavy, and a short life cycle. Moreover, the acid-lead battery packs had a short cycle life, long charge time, and did not provide sufficient battery power over a long range.

In order to overcome some of these limitations, the manufacturers of battery packs have realized that batteries using the nickel-metal hydride cells or lithium-ion cells were lighter and less bulky, with a longer cycle life, faster charging and provided higher output power for longer distances. Accordingly, the nickel-metal hydride or lithium-ion battery packs have become the storage media of choice for high power applications such as electric drive vehicles.

In spite of the enormous success of the nickel-metal hydride battery packs, these devices suffer from the drawback that they are typically custom-designed for a specific application, having regard to the mechanical, thermal and electrical design constraints that are specific to the application. As a result, these battery packs are not interchangeable and cannot be readily integrated in other vehicles or high power applications.

Another major drawback of the existing battery packs is that the service life of the battery pack is typically shorter than other components of the vehicle. Due to high current drainage and high thermal operating conditions, it is not uncommon for the battery pack to fail and be replaced. The vehicle system controller is a component separate from the battery pack itself and outlasts the battery pack. As a result, every time a battery pack is replaced, the vehicle system controller must be calibrated or even replaced so as to correspond with the specifications of the new battery pack. Moreover, although the failure of the battery pack may be due to non-ideal performance or breakdown of one or a few individual battery cells within the battery pack, often the entire battery pack is to be replaced, as it is not possible to diagnose and manage the battery cells individually during operation.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a universal battery module that can be easily integrated and used as standard building blocks for battery packs of various sizes and for various applications, such as electric vehicles, wind or solar energy storage devices, or telecommunication equipment.

It is a further object of this invention to provide battery modules with high volume production that are suitable for building battery packs of high performance and long life.

It is yet another object of the present invention to provide a master control module for power management of the universal battery modules in a battery pack.

The present invention arises from the realization that conventional battery packs used for high power applications such as electric vehicles are designed with the characteristics of the initial load consideration in mind. As a result, if the load capacity is varied or increased, the entire battery pack needs to be redesigned, reconfigured, or replaced to address the power, thermal and mechanical requirements of the new load. The present invention seeks to alleviate the shortcomings of existing batter packs by providing a flexible modular power storage platform that allows for interchangeability and expandability. The present invention provides a battery pack comprising a plurality of universal battery modules that are each configurable to be thermally, electrically, and mechanically coupled with the other universal battery modules in the battery pack in a modular fashion. The battery pack of the present invention can optionally include a controller to monitor the thermal and electrical characteristics of the unit, as well as to regulate and balance the power output of the universal battery modules in accordance with design and operation parameters.

The battery module of the present invention provides for a scalable and easily expandable battery system. The proposed modular design provides for sharing of power and cooling facilities, thus reducing production cost and simplifying manufacturing and reliability. In addition, a great reduction in vehicle inventory could be achieved if a single, reconfigurable battery module were able to provide equivalent functionality.

In a first aspect, the present invention provides a universal battery module having a plurality of series connected battery cells, sensor means coupled to the cells, the sensor means configured to transmit physical parameters of the cells, and a battery control unit in communication with the sensor means to control the cells based on physical parameters from the sensor means, wherein the battery control unit, the sensor means and the cells are packaged together as a single integral module.

In another aspect, the present invention provides a battery pack including at least two universal battery modules in a string of connected universal battery modules, each universal battery module including a plurality of series connected battery cells, sensor means coupled to the cells and configured to monitor and transmit physical parameters of the cells, a battery control unit in communication with the sensor means to control the cells based on physical parameters from the sensor means, and a master control module coupled to the string of universal battery modules, the master control module configured to control the battery pack power on/off and including internal electrical connector means to interface with each universal battery modules and control means to control electric equalization of the string of universal battery modules, wherein the string of universal battery modules and the master control module are packaged together as a single integral battery pack.

Other aspects and features of the present invention will become apparent to those ordinarily skilled in the art upon review of the following description of specific embodiments of the invention in conjunction with the accompanying figures.

BRIEF DESCRIPTION OF THE FIGURES

A better understanding of these and other embodiments of the present invention can be obtained with reference to the following drawings which show by way of example embodiments of the present invention, in which.

DETAILED DESCRIPTION OF THE INVENTION

Definitions

Figure 1A:
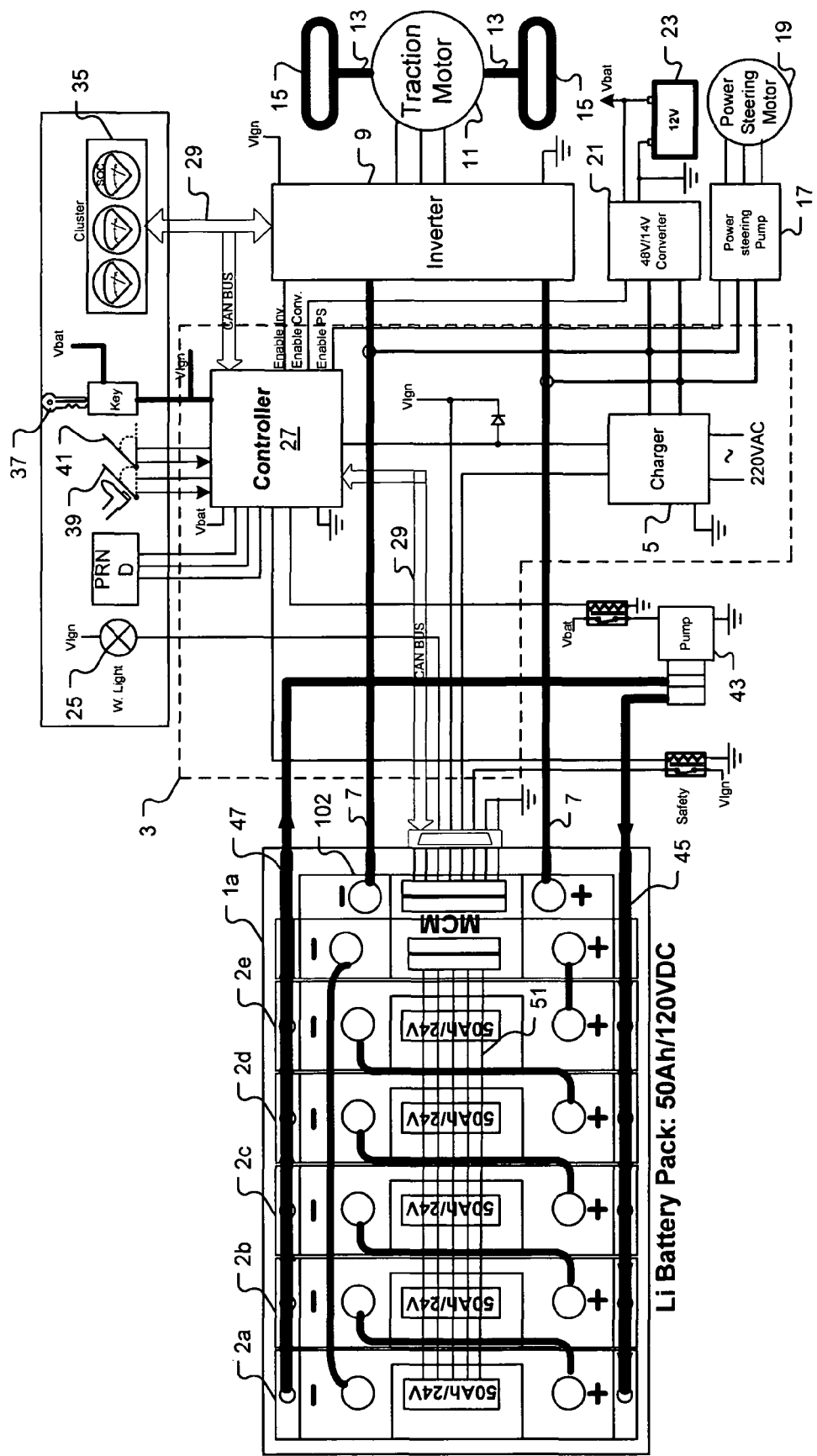
FIG. 1(a) is a block diagram showing the components of an electric vehicle including a battery pack having a plurality of UBMs controlled by a MCM according to an embodiment of the present invention.

The term "sensor" is used to define a device having a measurable sensor parameter in response to a characteristic of a measurand, such as temperature, voltage or current.

The term "controller" is used to define a microcontroller having a programmable central processing unit (CPU) and peripheral input/output devices (such as A/D or D/A converters) to monitor parameters from sensors or other devices that are electrically coupled to the controller. These input/output devices can also permit the central processing unit of controller to communicate and control the devices coupled to the controller. The controller includes one or more storage media collectively referred to herein as "memory." The memory can be volatile and non-volatile computer memory such as RAM, PROM, EPROM, EEPROM, memory disks, or the like, wherein control programs (such as software, microcode or firmware) for monitoring or controlling the devices coupled to the controller are stored and executed by the CPU. Optionally, the controller also provides the means of converting user-specified operating requirements into control signal to control the peripheral devices coupled to the controller, whereby the controller is configured to receive user-specified commands by way of a user interface such as a keyboard or a graphical user interface (GUI).

The term Control Area Network (CAN) bus is used to define a serial data bus for reliable and high-speed communication of control signals.

The term battery equalization is used to describe the operation to equalize the cell voltages under the same conditions (e.g. temperature) during charge or discharge states.

The term state-of-charge is used to define the remaining charge of the battery relative to its rated capacity.

Unless defined otherwise, all technical and scientific terms used herein have the same meaning as commonly understood by one of ordinary skill in the art to which this invention belongs.

Exemplary Embodiments

Generally, the present invention provides a battery pack having a plurality of electrically coupled UBMs and a MCM for controlling the battery pack. Each UBM has rechargeable electric power cells and primitive control circuitry capable of communicating control signals with other UBMS as well as a MCM using standard electrical interfaces and communication protocols over a CAN bus. The MCM is an advanced control module, which provides pack safety control and operation control of the high voltage battery pack. Accordingly, the UBMs can be used as generic building blocks for battery packs of various sizes and configurations to accommodate a variety of applications.

The UBM is capable of simple system control and therefore a battery pack may need no MCM. Each UBM can communicate control signals with other UBMs concerning its temperature, cell voltages, module's voltage and module equalization command. When working without MCM in a battery pack, each UBM is capable of receiving current shunt inputs to monitor the state-of-charge and of sending electrical signals to drive application-related devices such as relays, breakers or contactors, warning light and charge/discharge power controls.

At the heart of the MCM is an advanced control unit that monitors the UBMs performance, calculates the pack state-of-charge and provides operating safety control. The MCM also includes contactors that are coupled to the control unit and can turn on/off the battery pack. The MCM further includes a current shunt, a voltage sensor, and a ground fault sensor coupled to the control unit and can provide readings of battery pack current, voltage and di-electric impedance.

The MCM has two separated electric connectors that can interface to UBMs and an external system control unit. It collects information from UBMs and report cell voltages, pack temperature distribution, pack state-of-charge, pack current, pack status and malfunction codes to an external control system (such as the control system in an electric vehicle) from which it receives commands to activate contactors accordingly.

Exemplary embodiments of the present invention are now described with reference to accompanying drawings, wherein like elements are designated by like reference numerals throughout the drawings.

Universal Battery Module

Due to its expandability and interchangeability, the battery pack comprising the UBMs in accordance with the present invention can be used in a variety of applications that utilize battery power. The battery pack is particularly suited for electric vehicles in which electric motive power is employed to drive the vehicle.

There is shown in FIG. 1(a) a battery pack 1a having a plurality of UBMs 2a to 2e for use in an electric vehicle. The UBMs 2a to 2e serve as the basic building block for constructing the battery pack 1a. The UBMs 2a to 2e are a rated 24V DC or 36V DC battery modules with built-in intelligent electric control and cooling circuit. In a typical power control system such as the power control system 3 for an electrical vehicle shown in FIG. 1(a), a plurality of UMBs 2a to 2e is connected in series to form the battery pack 1a to provide sufficient power to drive the electric vehicle. The UBMs 2a to 2e are electrically coupled to a MCM 102, which controls the operation of the entire battery pack 1a.

The battery pack 1a comprising the UBMs is electrically coupled to a charger 5 through a high voltage DC power bus 7 for re-storing energy in the UBMs 2a to 2e. The charger 5 serves to charge the battery pack 1a during the charging stage and is a 220VAC to 120VDC power converter with its DC power controlled by charger control signals from MCM 102. Not only the DC power bus 7 carries charging power from the charger 5 to the battery pack 1a, it also transfers power discharged from the battery pack 1a to other vehicle devices. Accordingly, during the discharging stage, power stored in the battery pack 1a is discharged and transferred to an inverter 9 that is electrically coupled to the DC power bus 7 and a traction motor 11 for propelling the vehicle. The inverter 9 converts DC power from the battery pack 1a to AC power to drive the traction motor 11. The traction motor 11 is mechanically coupled to a drive shaft 13, which transmits mechanical energy to the vehicles wheels 15 and causes the vehicle to advance. Similarly, a power steering pump 17 that is electrically coupled to the DC power bus 7 provides electrical power to the power steering motor 19 of the vehicle. A power converter 21 coupled to the DC power bus 7 converts power from the battery pack 1a and charges the vehicle's battery 23, which serves to supplement power to various peripheral devices such as the lights 25, inverter 9, and instrument cluster 35 of the electric vehicle.

Advantageously, the DC power bus 7 is a standardized power bus. As a result, not only the battery pack 1a can be easily detached from the power control system 3 for testing or replacement, but also the battery pack 1a is compatible for use in other systems with different voltage requirements.

At the heart of the control system 3 is a controller 27, which is electrically coupled to a serial link CAN bus 29 for monitoring the operational status of various devices of the vehicle and to controls the flow of electric power on the DC power bus 7. The controller 27 also controls various operational aspects of the vehicle by communicating control signals over the CAN bus 29.

The instrument cluster 35 is electrically coupled to the ontroller 27 by way of the CAN bus 29 and displays information concerning the status of the vehicle and the battery pack 1a to the vehicle's operator. Preferably, the instrument cluster 35 should indicate all necessary information concerning the safety and reliability of the batter pack 1a. The operator can star-up or shut down the vehicle using the ignition key 37, or control the vehicle by the accelerator 39 or the brakes 41 that are connected to the controller 27. Signals from the ignition 37, accelerator 39, or brakes 41 are communicated to the controller 27, which controls the vehicle in accordance with the instructions of the operator.

In a high power application such as the electric vehicle control system shown in FIG. 1(a), heat dissipation becomes an important concern. Accordingly, pump 43 provides coolant circulation in conduits 45, 47 to cool and thermally equalize the UBMs 2a to 2e.

Figure 1B:
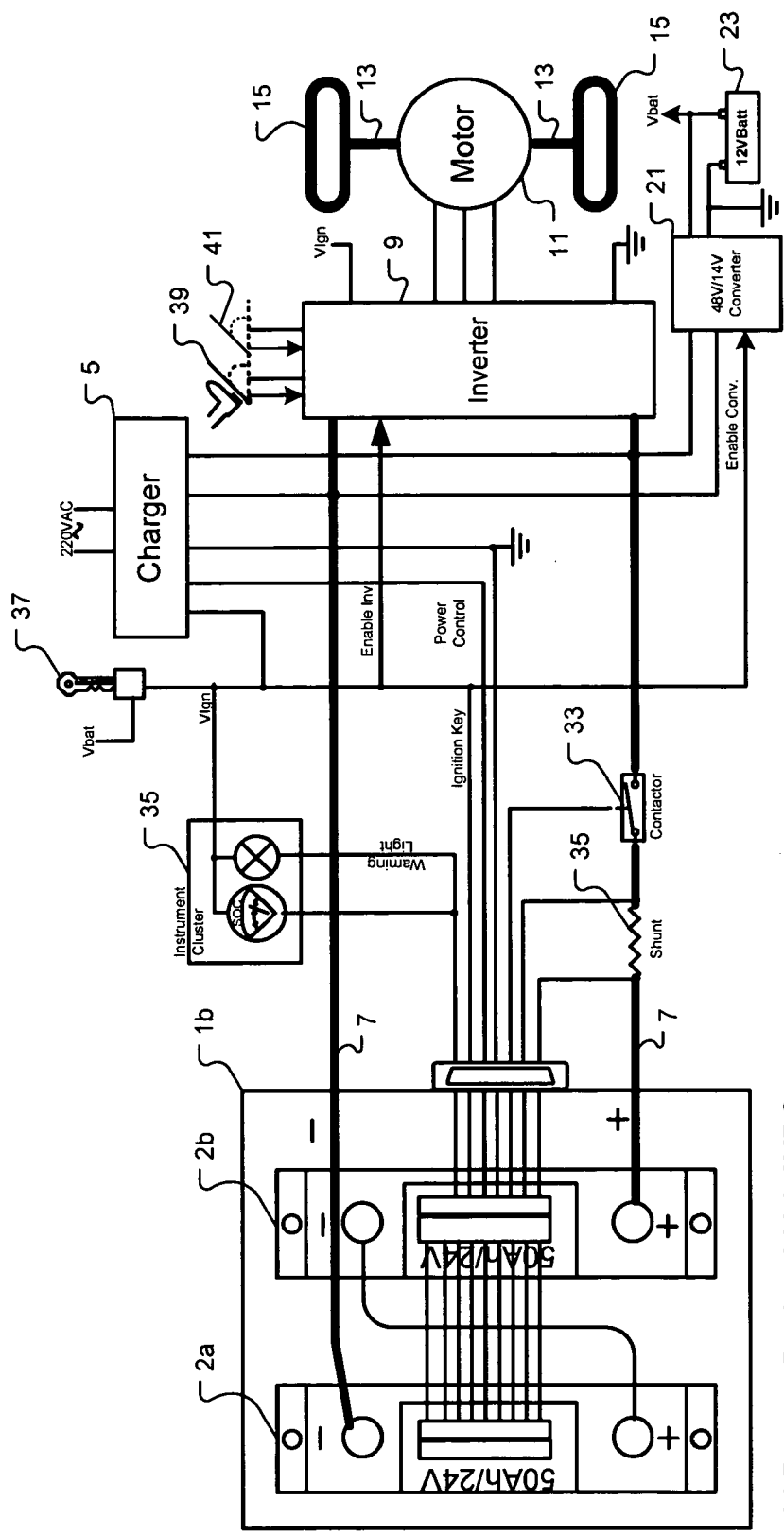
FIG. 1(b) is a block diagram showing the components of an electric vehicle including a battery pack having a plurality of UBMs according to another embodiment of the present invention.

Referring now to FIG. 1(b), there is shown a block diagram showing the components of an electric vehicle including a battery pack having a plurality of UBMs in an exemplary low voltage electric vehicle application. The battery pack 1b shown in FIG. 1(b) is suitable for low voltage applications and includes UBMs 2a and 2b. The battery pack 1b is similar to the battery pack 1a shown in FIG. 1(a), except that unlike the battery pack 1a, the battery pack 1b does not include a MCM 102 (shown in FIG. 1(a)). Instead, the UBMs 2a and 2b each include a built-in controller (not shown) that can be configured to control the battery pack 1b. In the presently described embodiment, the UBM 2b is responsible for controlling the battery pack 1b. Not only the UBM 2b monitor and control its own operational aspects, it also controls and interfaces with several external devices such as the instrument cluster 35 and the ignition key 37.

The UBM 2b receives signals from various sensors such as the shunt current sensor 31, which communicates the value of the current on the DC power bus 7 to the UBM 2b.

A contactor 33 connected to the DC power bus 7 is also electrically coupled to the UBM 2b and receives control signals from the UBM 2b. In the event that the operating conditions of the vehicle exceed the safe operating levels, the UBM 2b opens the contactor 33 to discontinue the flow of power on the DC power bus 7.

Figure 2:
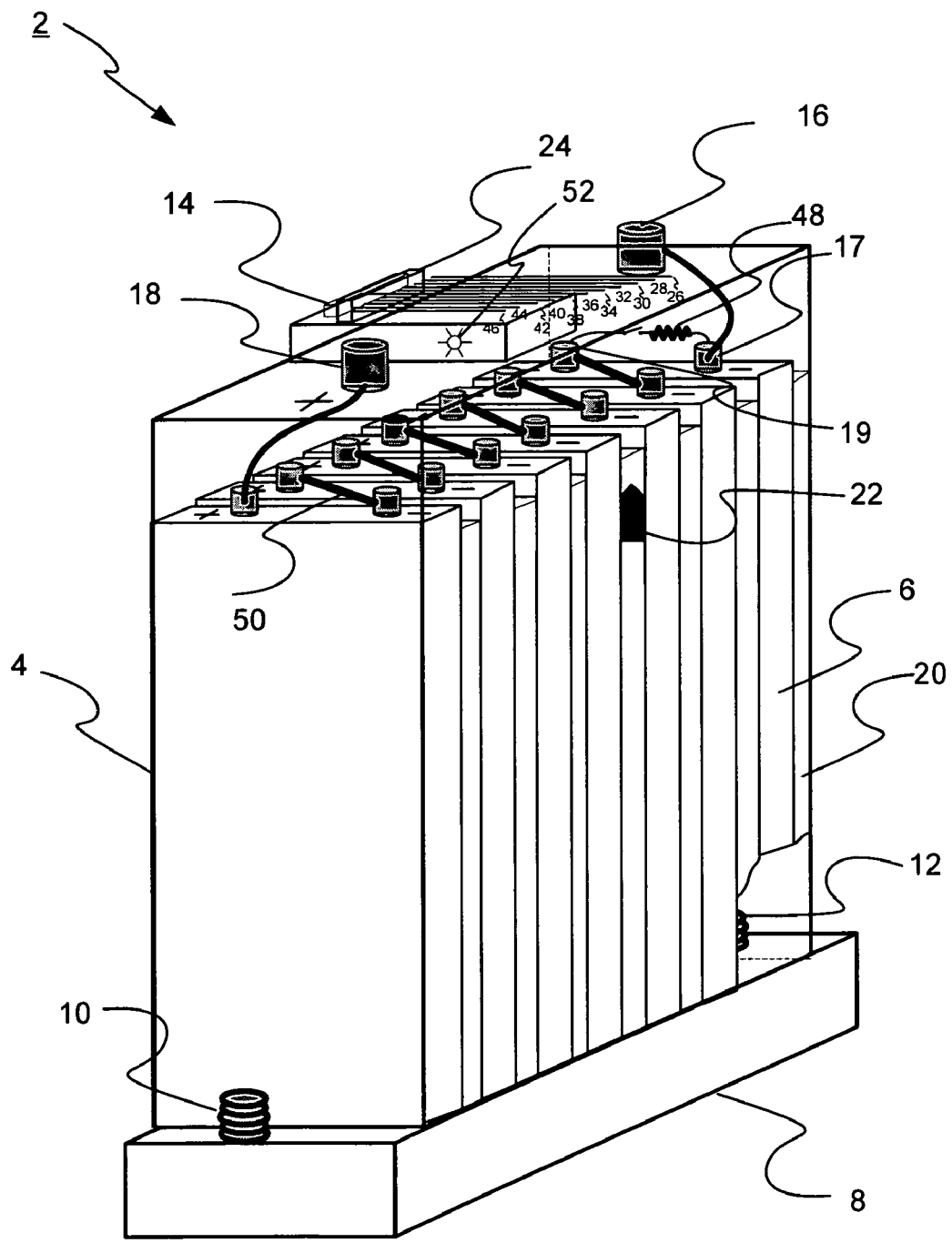
FIG. 2 is a perspective view of a UBM according to an exemplary embodiment of the present invention.

Reference is now made to FIG. 2, which shows an exemplary embodiment of a UBM in a battery pack (such as the battery pack 1a in FIG. 1(a)) according to the present invention. The UBM 2 shown in FIG. 2 includes a shell 4 coupled to a base plate 8 in a preferably hermetically sealed relationship to prevent moisture from penetrating the shell 4. The shell 4 contains therein a plurality of electrochemical battery cells 6 that are transversely positioned within a thermal frame 20 in a side-by-side fashion. The thermal frame 20 is in intimate contact with the cells 6 and is thermally coupled to base plate 8 to drive heat away from the cells 6. Moreover, the thermal frame 20 retains the cells 6 in thermal relationship to provide thermal balancing between the cells 6. Accordingly, if the temperature of a particular cell 6 abnormally rises during operation due to malfunction, the thermal frame 20 will distribute the excess heat throughout its frame thereby preventing a hotspot to occur. Advantageously, the thermal frame 20 is made of thermal conductive materials such as aluminum that equalize the temperature between cells 6.

In one embodiment, the base plate 8 is further configured to include channels (not shown) that are fluidly connected to inlet 10 and outlet 12 to allow liquid coolant circulate in the base plate 8 for improved heat dissipation. In another embodiment, the UBM 2 also includes a liquid cooling circuit that cools each cell 6 in the UBM 2 by circulating a liquid coolant around the thermal frame 20.

The cells 6 are electrically connected to one another in a series configuration by way of voltage conductors 50. In the presently described embodiment, the cells 6 are Lithium-ion battery cells that are connected in series to provide the voltage in the range of 24V DC or 36V DC through the anode 16 and cathode 18 terminals of the UBM 2. However, as it can be appreciated by those skilled in the art, the cells 6 can be connected in parallel, or a parallel series combination.

The UBM 2 is operational between two different states, namely a charge state, and a discharge state. During the charge state, the UBM 2 terminal voltage will increase when its state-of-charge increases by converting electric energy into chemical charges stored in the cells 6. During the discharge state, the UBM 2 voltage goes down when its state-of-charge decreases and releases the stored energy.

For each cell 6, a bypass resister 48 is connected across the terminals of the cell 6 to bypass the charge or discharge current. When a cell 6 voltage is higher than others during the charge state, the bypass resistor 48 reduces the charge current. When a cell 6 voltage is lower than others during the discharge state, the bypass resister 48 acts to reduce the discharge current.

Each UBM 2 in a battery pack (such as the battery pack 1a shown in FIG. 1(a)) comprises identical control logic and functional capabilities for self-initiated control of the physical parameters of the local UBM 2. Accordingly, the UBM 2 includes a Battery Control Unit (BCU) 14 that monitors the cell 6 voltages and module temperature, controls voltage equalizations between cells 6 and communicates various information regarding status of the UBM 2 during charge and discharge states to other UBMs 2 and the master control module MCM which is described in further detail in connection with FIG. 4 hereinafter.

In the presently described embodiment of the invention, the BCU 14 is implemented using a controller as defined herein. The BCU's 14 memory includes predefined values for the temperature and voltage thresholds of the UBM 2. The predefined values are stored in the BCU 14 memory in a look-up table. The BCU 14 is electrically coupled to a connector 24 to communicate signals corresponding to the operating status of the UBM 2 to a MCM, or other UBMs 2 in a battery pack.

The connector 24 protrudes from the shell 4 and provides terminals 26 to 46 for connection with a serial communication CAN bus, for instance the CAN bus 29 in FIG. 1(a). Alternatively, the connector 24 can be configured such that it would directly connect with a mating connector from a subsequent UBM 2 in a battery pack. Through terminals 26 to 46, the BCU 14 transmits electrical control signals corresponding to various aspects of the UBM 2 over the serial communication CAN bus such as the CAN bus 29 in FIG. 1(a) that is electrically coupled to terminals 26 to 46 in order to transmit or receive control signals from peripheral devices in a power control system. Preferably, the control signals are adapted to drive relays, contactors, or similar actuating devices.

In a battery pack comprising a plurality of UBMs 2 such as the UBMs 2a to 2e in the battery pack 1a shown in FIG. 1(a), each BCU 14 needs a communication channel for passing its control signals to other BCUs 14 in the battery pack. This can be achieved by coupling terminals 26 and 28 of each BCU 14 to a serial communication bus such as the CAN bus 51 shown in FIG. 1(a), which serves as the main communications channel for the various BCUs 14 in the battery pack. The BCUs 14 can optionally communicate with each other on the serial communication CAN bus using a master or a proprietary CAN communication protocol.

For small applications that need low voltage battery system, these control signals can be used to provide basic system control without using an external controller for controlling the entire battery pack. The control signals will not be used (not connected) when building a large battery pack with an internal MCM for controlling various operational aspects of the battery pack.

The signals available at terminals 26 to 46 are summarized in the Table 1 below:

TABLE 1

UBM terminal description

| Terminal | Function | Control Signals |
|---|---|---|
| 26 | CAN+ | CAN Bus, UBM voltage, current |
| 28 | CAN– | State-of-Charge, di-electric impedance, fault code, etc. |
| 30 | Ignition | Ignition On/Off |
| 32 | Warning Light | Flashing when charging Solid when over or under voltage or over temperature |
| 34 | Power Control | Charger control |
| 36 | Sequence UP | Input signal for automatic numbering |
| 38 | Sequence DOWN | Output signal for automatic numbering |
| 40 | GND | Chassis ground |
| 42 | Contactor | Contactor control, Safety control |
| 44 | Diff IN+ | Shunt current sensor Differential input+ |
| 46 | Diff IN– | Shunt current sensor Differential input– |

As indicated in Table 1, The connector 24 further communicates other control signals generated from the BCU 14, such as a contactor signal at terminal 42, a warning light signal at terminal 32, and power control signal at terminal 34 to provide simple system operation control and differential shunt voltage inputs Diff IN+ 44, and Diff IN– 46 to measure the current of the battery pack (such as the battery pack 1b shown in FIG. 1(b)). For example, in the low voltage application of FIG. 1(b), the current shunt 35 communicates the value of the current on DC power bus 7. Terminal 36 communicates a "sequence UP" signal from the BCU 14 that is the input to the present UBM 2 enable/disable the sequence number arbitration of UBM 2 within the battery pack. Terminal 38 indicates a "sequence Down" signal from the BCU 14 that is the output to enable/disable the next adjacent UBM 2 to arbitrate the sequence number of the UBM 2 in the plurality of UBMs 2 in a battery pack for an external controller to recognize it. In the event there are only two UBM 2 in the battery pack, the single UBM 2 with no "sequence Up" input connection is considered as the first UBM 2 which will be responsible for simple system control. This is the case with UBM 2b described in FIG. 1(b).

High power batteries, particularly those used in automotive applications such as the one shown in FIGS. 1(a) and 1(b), generate tremendous amounts of heat during operation. Not only the heat reduces the life of the cells 6, but also it is hazardous to safe operation of the system incorporating the power system 3. To control the thermal characteristics of the UBM 2, a heat sensor 22 (such as a thermostat) is provided to monitor the heat generated by the cells 6. The heat sensor 22 is in thermal relationship with the thermal frame 20 and electrically connected to the BCU 14. The BCU 14 constantly monitors the temperature of the UBM 2 and compares the temperature with the predefined acceptable threshold stored in the BCU 14. There are two levels of threshold: (i) warning threshold; and (ii) off threshold. If the UBM 2 temperature exceeds the predefined warning threshold, the BCU 14 will first sends a warning flag on signal at terminals 26 and 28 so as to communicate the warning flag via the CAN bus 29 to the controller 27 (as shown in FIG. 1(a)). The BCU 14 will only shut down the UBM 2 if the temperature continues to rise pass the threshold.

The BCU 14 sends the warning light signal at terminal 32 with its duty cycle in reverse of the battery pack state-of-charge. For instance, when state-of-charge is larger than 60%, the warning light 32 is set to duty cycle 2%; when state-ofcharge is 5%, the warning light 32 duty cycle is 99%. Similarly, when the BCU 14 detects that the operating temperature of the UBM 2 exceeds a safety limit, the state-of-charge is less than 3% or that the UBM 2 is over voltage or under voltage, it will keep the warning light signal at a duty cycle of 99%. The warning light signal at terminal 32 is optionally transmitted to a warning light 52 that is connected to terminal 32, which would indicate a solid light when the UBM 2 is over or under voltage, over discharged, or when the temperature of the UBM 2 exceeds the predetermined thresholds.

Under normal operating conditions, the module power control signal available at terminal 34 is set at 98% duty cycle. If any cell 6 voltage is closer to a predetermined constant voltage set point, the power control signal duty cycle will start reducing down to 2%. This signal can be used to control a charger (such as charger 5 shown in FIG. 1(*a*)) coupled to the UBM 2 whose charging power is proportional to its control input signal duty cycle. When the control signal duty cycle is reducing, the charger output power is reducing and therefore no cell 6 voltage will exceed the constant voltage set point. A proportional integral derivative (PID) algorithm is implemented in BCU 14 in software or firmware, which constantly monitors the voltage and maintains the cell voltage below a set point.

As shown in FIG. 1(*b*), a current shunt 35 can be electrically connected in series to the battery pack's output power terminal 18 to provide differential feedback to BCU 14, thereby allowing the BCU 14 to monitor the current characteristics of the battery pack in either the charge or discharge states. This current shunt 35 is electrically coupled to BCU 14 through terminals Diff IN+ 44, and Diff IN− 46 and communicates the current characteristics to the BCU 14 for monitoring the battery state-of-charge.

Figure 3:
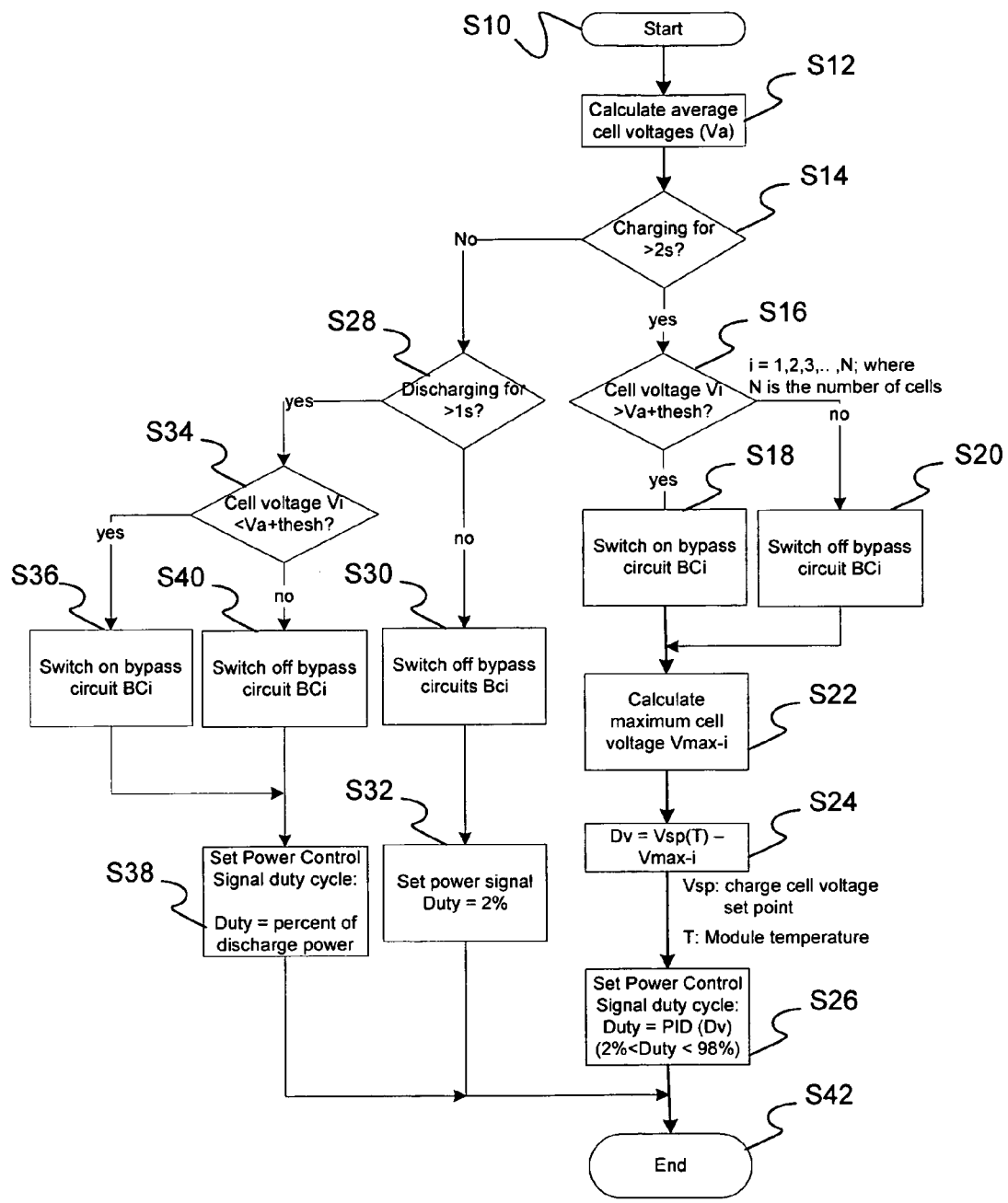
FIG. 3 is a flow diagram indicating the steps involved in equalization and charging of cells in the UBM.

Reference is now made to FIG. 3, which shows a flow diagram indicating the steps involved in equalization and charging of cells 6 by BCU 14. These steps can be implemented in BCU 14 by firmware or software in BCU 14. For the purposes of FIG. 3, it is assumed that there are N cells 6 in a battery pack. When the power on signal at terminal 30 is detected (Step S10), the BCU 14 enters the operation mode wherein it continuously monitors the cell equalization status. When during charging the cell 6 voltages become diversified, the BCU 14 will enter cell electric equalization mode to equalize the cells 6 (e.g. turn on the bypass circuit of those cells 6 whose voltage is above or below the average voltage of the cells 6 within the UBM 2 with a predetermined error). At the same time, the BCU 14 continuously reports the maximum and minimum cell 6 voltages as well as UBM 2 temperature via the serial communication CAN bus 29 (shown in FIG. 1(*a*)). Accordingly, the BCU 14 first calculates the average cell 6 voltages to determine the average cell voltage $V_{ave}$ (Step S12). The BCU 14 then verifies whether the cells 6 have been in the charging state for more than 2 seconds (Step S14). If the cells 6 have been charged for over 2 seconds, the BCU 14 compares the voltage $V_i$ of each cell 6 with the average voltage $V_{ave}$ plus the voltage threshold (Step S16).

If the cell 6 voltage $V_i$ is larger than the combination of average voltage $V_{ave}$ plus the voltage threshold, the BCU 14 switches on a bypass circuit $BC_i$ for that particular cell 6, so as to bypass some current from charging the cell 6. (Step S18). However, if the cell 6 voltage $V_i$ is within the voltage threshold, the BCU 14 shuts off the bypass circuit $BC_i$ 48 for that cell 6 (Step S20). The BCU 14 subsequently determines the maximum cell voltage $V_{max-i}$ for the cell 6 (Step S22). At this juncture, the BCU 14 determines Dv according to the following equation: $Dv = V_{sp}(T) - V_{max-i}$, whereby Dv corresponds to the difference between the charge cell 6 voltage set point $V_{sp}(T)$ for the current operating temperature T of the UBM 2, and the $V_{max-i}$ for the cell 6 (Step S24). On the basis of the Dv, the BCU 14 sets the charger's duty cycle from the PID algorithm. The duty cycle is set not to exceed 98% or fall below 2% (Step S26).

If the cells 6 have not been charged for over 2 seconds, the BCU 14 then checks to see whether the cells 6 have been discharging for more than 1 second (Step S28). In the event the cells 6 have not been discharging for over 1 second, then all the bypass circuits within the UBM 2 are turned off (Step S30) and the charger's (such as charger 5 in FIG. 1(*a*)) duty cycle set to 2% (Step S32).

During the discharge state, a power control signal is used to indicate the maximum discharge power allowed. Therefore, if the cells 6 have been discharging for over 1 second, discharge state is confirmed and the power control signal duty cycle is set as a percentage of the current discharge power over the maximum allowed discharge power (Step S38).

If the cells 6 have been discharging for over 1 second, then the BCU 14 compares the voltage $V_i$ of each cell 6 with the average voltage $V_{ave}$ plus the voltage threshold (Step S34). If the cell 6 voltage $V_i$ is smaller than the combination of average voltage $V_{ave}$ plus the voltage threshold, the BCU 14 activates the bypass circuit $BC_i$ for the cell 6 in order to bypass some current from discharging the cell 6 (Step S36). However, if the cell 6 voltage $V_i$ is within the voltage threshold, the BCU 14 shuts off the bypass circuit $BC_i$ for that cell 6 (Step S40).

Master Control Module

Figure 4:
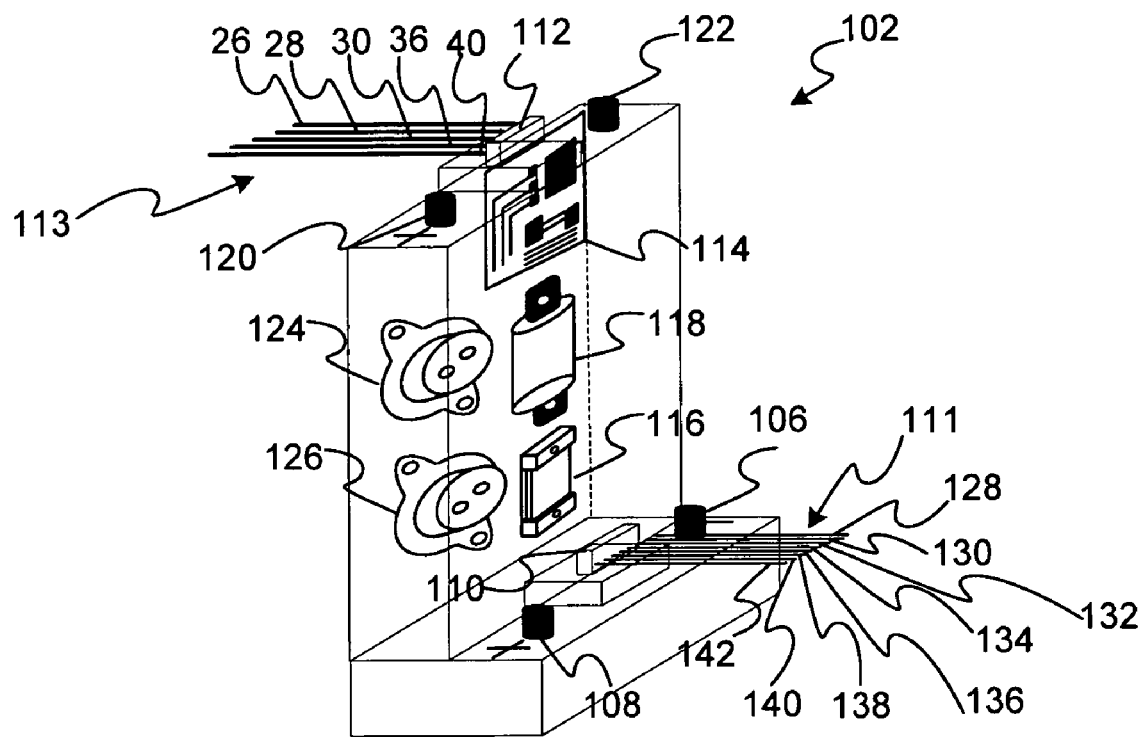
FIG. 4 is a perspective view of a MCM according to an exemplary embodiment of the present invention.

Reference is now made to FIG. 4, which illustrates a Master Control Module (MCM) 102 for controlling a battery pack (such the battery pack 1*a* shown in FIG. 1(*a*)). The MCM 102 is an interface and control module that monitors operating parameters of the entire battery pack and manages the UBM 2 resources to achieve the safe operation of the battery pack.

As illustrated in FIG. 4, the MCM 102 includes internal positive 120 and negative 122 power terminals, external power positive 108 and negative 106 terminals, and a controller coupled to a first connector 112 for internal serial communication with at least a UBM 2 in a battery pack (not shown in FIG. 4). The MCM 102 communicates control signals with the UBMs 2 by way of a serial communication link, such as CAN bus, that is coupled to the terminals of the connector 112.

The MCM 102 further includes a second connector 110 for external serial communication with various peripheral devices such as the battery charger in a system. Accordingly, the MCM 102 separates the external serial communication with the internal serial communication with two serial buses CAN1 bus 113 and CAN2 bus 111 coupled to the first connector 112 and second connectors respectively 110, respectively. The MCM 102 and its interfaces, include the following signals sa described in Table 2 below:

TABLE 2

MCM terminal description

| Terminal | Function | Control Signals |
|---|---|---|
| 128 | CAN+ | CAN Bus |
| 130 | CAN− | CAN Bus |
| 132 | Ignition | Ignition On/Off |
| 134 | Warning Light | Flashing when charging Solid when over or under voltage or over temperature |
| 136 | Power Control | Charger control |

TABLE 2-continued

MCM terminal description

| Terminal | Function | Control Signals |
|---|---|---|
| 138 | Safety Interlock+ | Energized during operation |
| 140 | Safety Interlock− | Energized during operation |
| 142 | GND | Chassis ground |

The MCM 102 also includes a main contactor 124, a pre-charge contactor 126, a current shunt 116, a fuse 118 and a controller 114 that includes a di-electrical impedance detection circuitry. It supports battery packs of voltages above 72V with internal CAN1 bus 113 isolated from the CAN2 bus 111 which interfaces directly to the system control serial communication bus. The MCM 102 optionally includes a fuse that will disconnect the power to the battery pack when the battery pack is short-circuited. It can switch on/off the high voltage bus by built-in contactors 124, 126, which are controlled according to CAN, command or power on signal.

The safety interlock terminals 138, 140 are to enable the closing of the built-in contactors 124, 126. Only when energized, the contactors 124, 126 can be closed to output power or accept charges. This protection allows the high voltage power from the battery pack to be cut off in emergency by a physical switch.

The UBM 2 is generally maintained in a voltage range during the charge stage so as to prevent over voltage during charging and maximizing the charging of the battery pack. The MCM 102 monitors both the cell 6 (shown in FIG. 1(*a*)) voltages and the charging current supplied to the battery pack comprising a number of UBMs 2 (such as UBMs 2*a* to 2*e* in battery pack 1*a* shown in FIG. 1(*a*)) and controls the charging power via power control signal 136 during a charge cycle so as to prevent overcharging of the battery pack.

The MCM 102 can also be configured and arranged to send an electrical signal to drive the warning light and charger. Advantageously, the MCM 102 is configured to further monitor the battery pack charge/discharge current and high voltage bus di-electric impedance level (Ohm) with a SAE recommended circuit (not shown). In another embodiment, a voltage sensor is provided to determine the voltage from the battery pack. Accordingly, the MCM 102 can also monitor the battery pack instantaneous and average voltage based on sensed voltage communicated to the MCM 102 by the voltage sensor.

Figure 5:
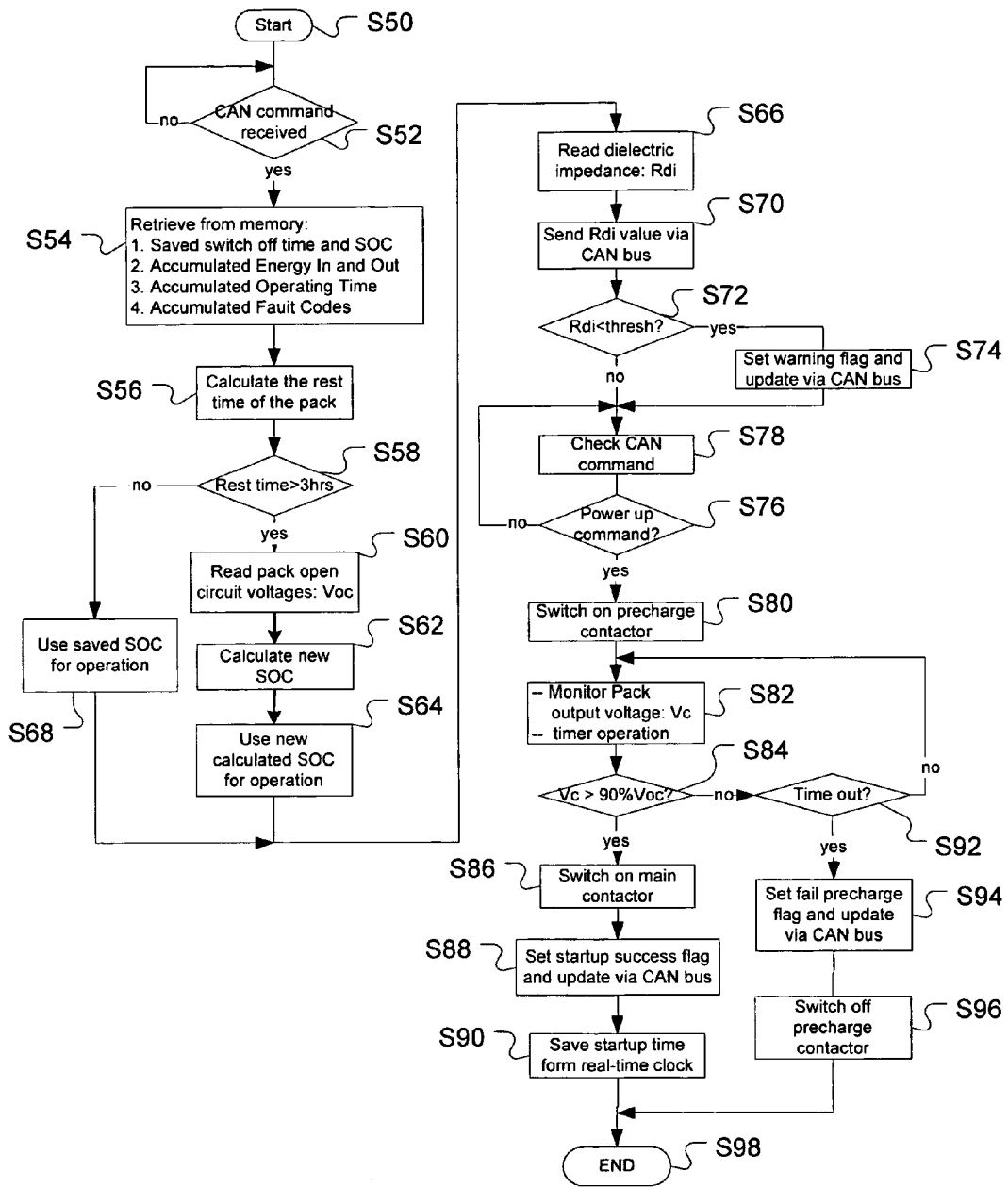
FIG. 5 is a flow diagram indicating the steps involved start-up operation of the MCM.

Reference is now made to FIG. 5, which illustrates the steps in the start-up operation of the MCM 102 shown in FIG. 4. Initially, the MCM 102 monitors the CAN2 bus 111 to determine whether a CAN signal has been received on CAN2 111 (Step S52). If a CAN signal has been initiated from the power control system (such as the power control system 3 shown in FIG. 1(*a*)), the MCM 102 retrieves from its memory the: (i) Saved time when the pack is switched off; (ii) the pack state-of-charge from last switched off; (iii) accumulated Energy In and Out in the battery pack's life; (iv) accumulated Operating Time in the battery pack's life; and (v) Accumulated Fault Codes in the battery pack's life (Step S54). The MCM 102 then calculates the resting time of the battery pack (Step S56) since it was last switched off. The MCM 102 resolves whether the rest time exceeds a predetermined time frame, for instance 3 hours (Step S58). If the rest time is longer than 3 hours, then the MCM 102 obtains the battery pack open circuit voltage $V_{oc}$ (Step S60), on the basis of which, it calculates a new SOC for the battery pack (Step S64). The MCM 102 proceeds to obtain the di-electric impedance $R_{di}$ of the battery pack (Step S66). If the rest time is not longer than 3 hours, the MCM 102 uses the saved SOC operation value (Step S68) as the new SOC value. The new SOC is used for columbic integration calculation (Step S64) as the initial value and directly proceeds to obtain from the di-electric detection circuit 114 the di-electric impedance $R_{di}$ of the battery pack (Step S66).

The MCM 102 proceeds to measure the di-electric impedance $R_{di}$ of the battery pack (Step S66) and communicates the di-electric impedance $R_{di}$ on the CAN bus (Step S70) and compares the di-electric impedance $R_{di}$ with the threshold value (Step S72). If the di-electric impedance $R_{di}$ is less than the threshold value, the MCM 102 sets a warning flag and communicates the flag via the CAN bus. The MCM 102 then checks whether there is a power up command on the CAN2 bus 111 (Step S76). If the di-electric impedance $R_{di}$ is larger than the threshold value, the MCM 102 will wait the power up/down command via CAN2 bus 111 from the system controller (Step S76, S78). If there is a power up command on the CAN2 bus 111, then the MCM 102 switches on the precharge contactor (Step S80), otherwise it will wait for a the power up command from CAN2 bus 111 (Step S76).

To control the precharging, the MCM 102 monitors the battery pack output voltage $V_c$ and the precharging time (Step S82). If the output voltage $V_c$ is larger than 90% of a threshold voltage level $V_{oc}$ (Step S84), then the MCM 102 activates the main contactor (Step S86), sets startup flag and updates via the CAN bus 111 (Step S88), and saves the start-up time from the built-in real-time clock (Step S90). If the output voltage $V_c$ is less than 90% of the $V_{oc}$ (Step S84), the MCM 102 verifies whether the precharging timer is timeout (Step S92). If not, then the MCM 102 MCM 102 monitors the battery pack output voltage $V_c$ and monitors the waiting time (Step S82). In the event that the timer is timeout, the MCM 102 sets fail precharge flag and updates via the CAN2 bus 111 (Step S94) and switches off the precharge contactor (Step S96).

Figure 6:
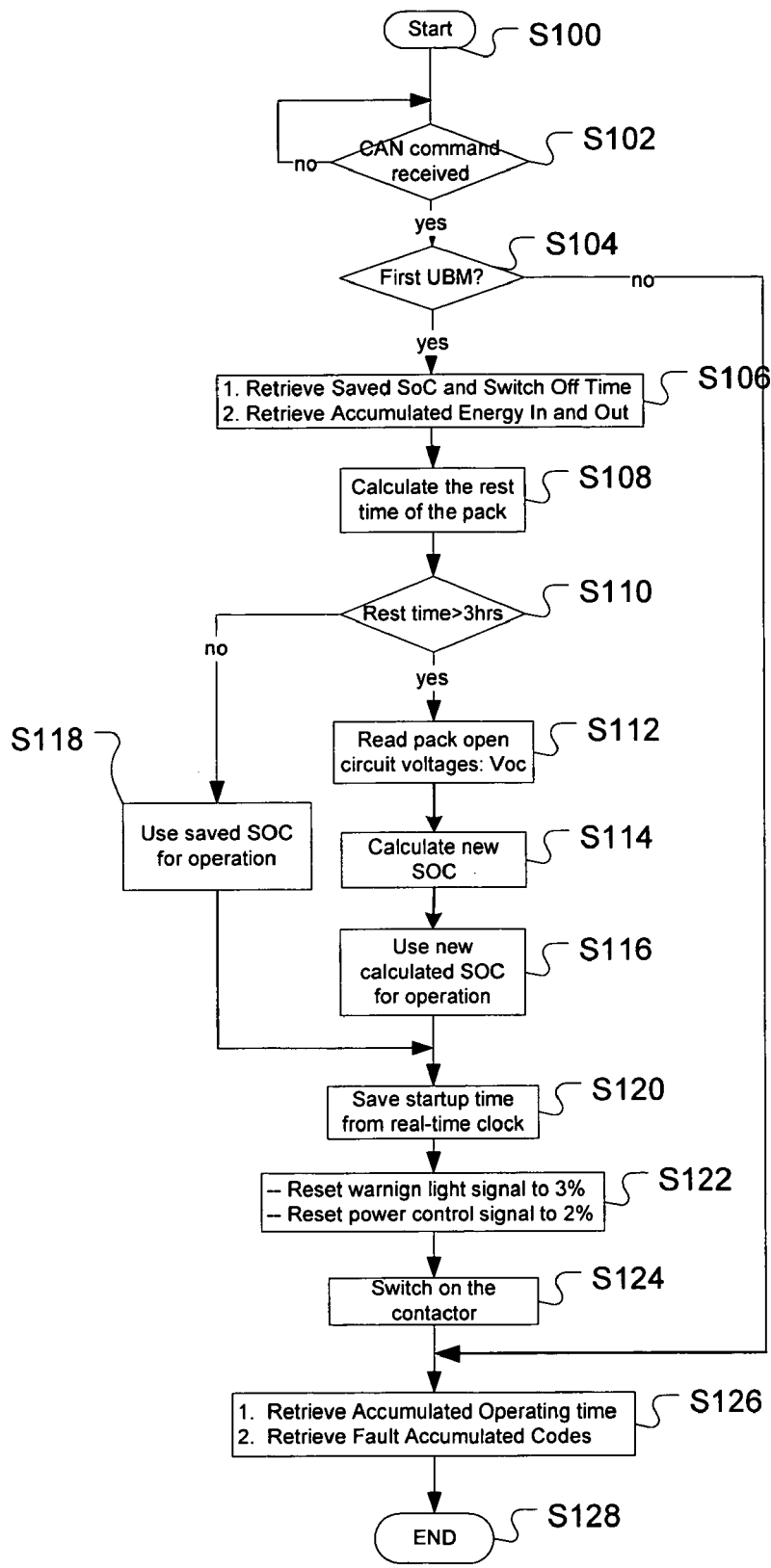
FIG. 6 is a flow diagram showing the steps in the start-up operation of the UBM.

Reference is now made to FIG. 6, which in conjunction with FIG. 2, illustrates the steps in the start-up operation of a UBM 2. Initially, the UBM 2 monitors a CAN bus coupled to the BCU 14 terminals 26 and 28. If there is a MCM 102 present in the battery pack, its CAN1 bus 113 (shown in FIG. 4) is coupled to the BCU 14 terminals 26 and 28. The BCU 14 monitors the CAN1 bus 113 and waits for a CAN command placed on the CAN1 bus 113 by the MCM 102 or other UBMs 2 in the battery pack (Step S102). If a CAN command has been received, either from the MCM 102 or other UBMs 2, the BCU 14 will further check whether it is the first UBM 2 (i.e. no MCM 102 in the battery pack) in the pack (Step S104).

If the UBM 2 it is not the first UBM (i.e. there is a MCM 2 present in the battery pack), the BCU 14 retrieves from its memory the: (i) accumulated Operating Time in the battery pack's life; and (ii) Accumulated Fault Codes in the battery pack's life (Step S126) and finalizes the startup process (Step S128).

If the UBM 2 is the first UBM, its BCU 14 has to initialize to provide battery pack control functions. The BCU 14 therefore retrieves from its memory (i) Saved time when the pack is switched off; (ii) the pack state-of-charge from last switched off; (iii) accumulated Energy In and Out in the battery pack's life (Step S106).

To determine the initial SOC, the BCU 14 first calculates the battery pack resting time (Step S108). The BCU 14 then checks whether the battery pack has been inactive for over 3 hours (Step S110). If the battery pack rested for not longer than 3 hours, the BCU 14 uses the saved SOC value as the initial integration value to calculate battery pack SOC during the following operation (Step S118). If the battery pack rested for longer than 3 hours, the BCU 14 will read the pack open circuit voltage (Step S112) and use it to calculate the new SOC (Step S114) as the initial integration value to calculate pack SOC during the following operation (Step S116).

After finishing initial SOC calculation, BCU 14 will initialize the battery pack by saving the startup time to its memory for later use to calculate operation time (Step S120) and reset warning light signal duty cycle to 3% (warning light off) and reset power control signal duty cycle to 2% (charger power off) (Step S122). When the above initialization completed, BCU 14 will switch on the contactor (Step S124) to supply power (e.g. for vehicle driving) or receive charging. The BCU 14 retrieves from its memory the: (i) accumulated Operating Time in the pack's life; and (ii) Accumulated Fault Codes in the pack's life (Step S126) to complete the startup processing (Step S128).

There are generally five UBM and four MCM operational modes that are deemed required in a typical application. During a typical operation cycle, the battery pack operating mode may be switched between the available modes in response to system control requests. These modes can be implemented in software or firmware as known by those skilled in the art.

Figure 7:
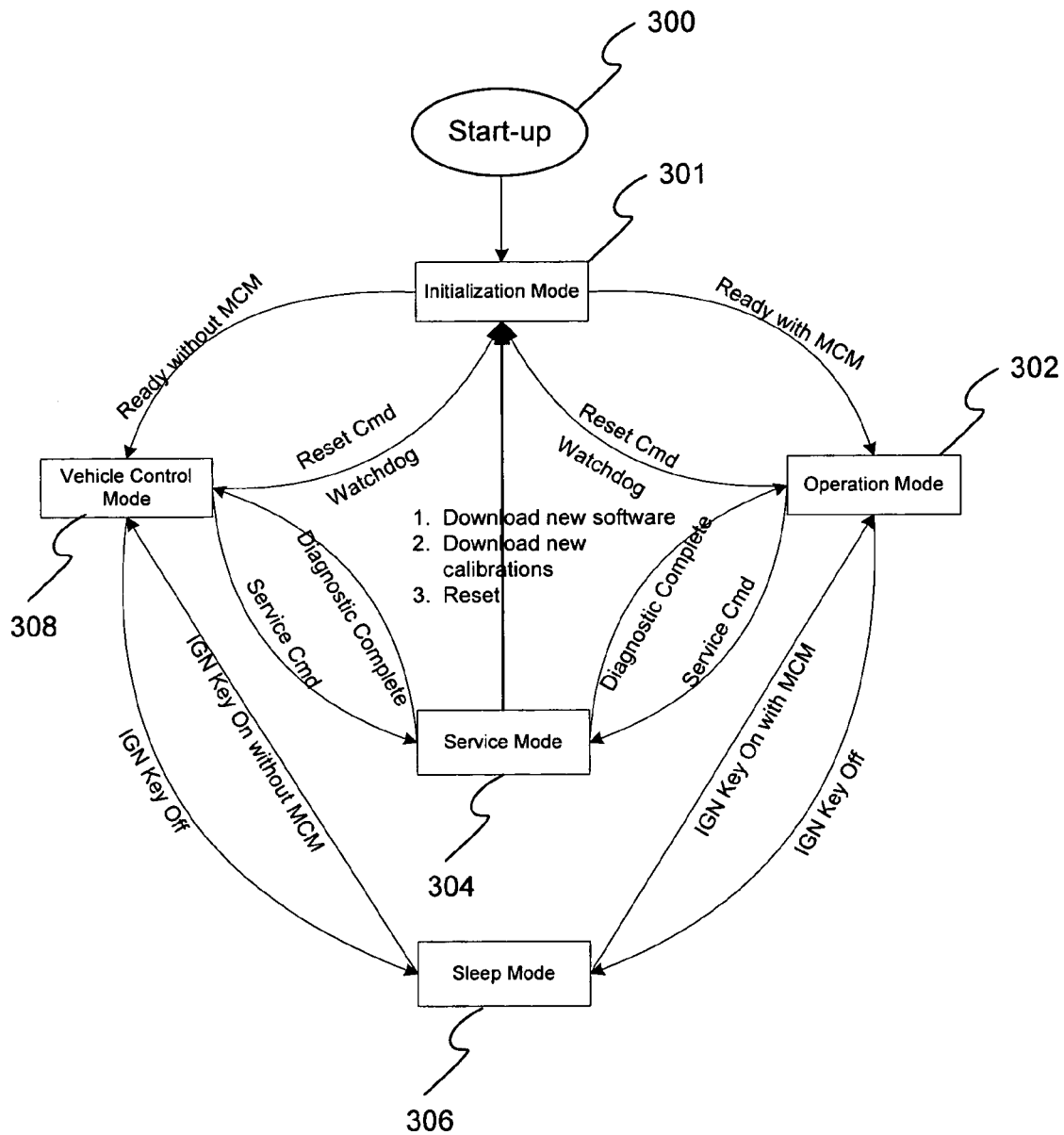
FIG. 7 a state diagram illustrating various modes of operation of the UBM.

Referring now to FIG. 7, a state diagram illustrating various modes of operation of a UBM 2 shown in FIG. 2. As illustrated, the UBM 2 may operate in the following modes: (i) initialization mode 301; (ii) operation mode 302; (iii) service mode 304; (iv) sleep mode 306; and (v) control mode 308 in operation.

In the initialization mode 301, the BCU 14 reboots. In this mode, the BCU 14 will reload the parameters include CAN communication baud rate and repetition rate and conduct module sequence number arbitrations. There are three cases that UBM 2 will enter initialization mode: (i) from first time power up 300; (ii) external service reset command from service mode 304; and (iii) UBM 2 watchdog reset from normal operations, 302 or 308.

During operation mode 302, the BCU 14 will continuously monitor the cell 6 voltages and UBM 2 temperature. Base on the cell 6 voltage distribution, the BCU 14 may turn on/off cell equalization bypass circuits to equalize the cell 6 voltages. When over voltage of any cell 6 or over temperature of the UBM 2 are detected, the BCU 14 sends alarm signals through CAN1 bus 113.

The BCU 14 also sends data (such as information concerning the cells 6 voltage or temperature) periodically to the MCM 102. When synchronized voltage measuring command via CAN1 bus 113 is received from MCM 102 or the first UBM 2, the BCU 14 will sample all the cell 6 voltages and report via CAN1 bus 113 immediately. When a global equalization command is received by the BCU 14 from the CAN1 bus 113, all the cell 6 equalization circuits will be turned on until removal of the command.

In low voltage applications such as those shown in FIG. 1(*b*) where the first UBM 2*b* controls the battery pack functions, the BCU 14 for the first UBM 2 will open the contactor 33 if the alarm flags from CAN1 bus 113 from any UBM 2 exists continuously for more than three updates of the CAN messages or more than three UBMs 2 report the alarms at the same time, and turns on the warning light when over voltage of any cell 6 or over temperature of the UBM 2 are detected.

In the service mode 304, the BCU 14 can upload new software (or firmware) or update the parameters to its memory. The new uploaded software or parameters won't take effect until the next time the UBM 2 enters into the initialization mode 301. Accordingly, if the reset command is present on the CAN1 bus 113, the BCU 14 reloads the new software or parameters and re-initializes itself to its new configurations, reloads the new version of software. During the service mode 304, the BCU 14 is configured to transmit via the CAN1 bus 133 operating status information (such as cell 6 voltages, UBM 2 temperature, current operating parameters, error codes, etc.) for diagnostics purposes.

During the sleep mode 306, at ignition off (i.e. terminal 30 of the BCU 14), UBM 2 enters sleep mode for energy conservation and to reduce the power consumption. While in the sleep mode 306, all BCUs 14 (include CPU, CAN transceiver and power regulators) will enter sleep mode and can be woken up at ignition power on.

During the initialization mode 301, if the UBM 2 determines that it is the first module (with no enable input) in a battery pack and there is no MCM 102, it enters the control mode 308. In this mode, the BCU 14 not only controls the UBM 2 as in operation mode 302 but also monitors the battery pack current via shunt differential inputs and controls the warning light, contactor and power control to provide basic power on/off and charging control. In the control mode 308, the BCU 14 also transmits control signals such as synchronized voltage measurement or global equalization over the CAN bus to other UBMs 2 for battery pack equalization. In a preferred embodiment, these control signals can be communicated to an instrumentation cluster (such as the instrument cluster 35 shown in FIG. 1(*a*)) for display of the battery pack state-of-charge and fault status.

Figure 8:
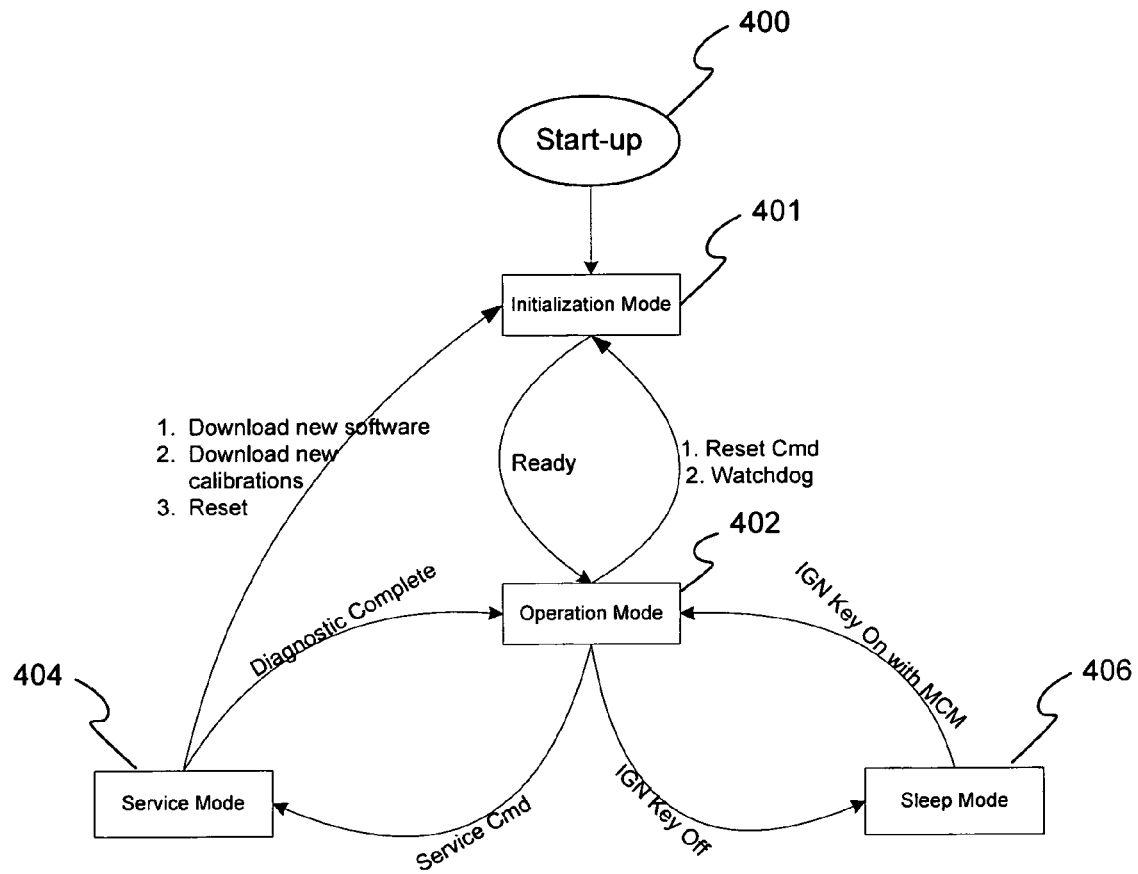
FIG. 8 a state diagram illustrating various modes of operation of the MCM.

Reference is now made to FIG. 8, which shows a state diagram illustrating various modes of operation of the MCM 102 of FIG. 4. As indicated in FIG. 8, the MCM 102 modes of operation are as follows: (i) initialization mode 401; (ii) operation mode 402; (iii) sleep mode; and (iv) service mode.

For first time power up at Start-up mode 400, the MCM 102 enters the initialization mode 401, whereby it reloads saved parameters (such as CAN bus baud rate, CAN communication update rate, SOC, accumulated charge/discharge columbic, accumulated working hours, etc.) and fault information from last power on cycle.

In the operation mode 402, the MCM 102 controls basic battery pack operations, namely, module equalization, system precharge and main power on/off. At the same time the MCM 102 monitors the battery pack current, voltage and high voltage bus dielectric impedance, and calculates battery pack SOC and charge/discharge capacity. It reports these values regularly with operating modes as well as fault status via CAN2 bus 111 to the power control system (such as the power control system 3 shown in FIG. 1(*a*)).

In the service mode 404, MCM 102 can upload new software (or firmware) or update the parameters to its memory. The new uploaded software or parameters won't take effect until the next time the MCM 102 enters into the initialization mode 401. If the reset command is present on the CAN2 bus 111, the MCM 102 reloads the new software or parameters and re-initializes itself to its new configurations. Moreover, during the service mode 404, the MCM 102 is configured to transmit via the CAN2 bus 111 operating status information concerning the UBM 2 (UBM 2 voltage and current, UBM 2 temperature, error codes, etc.) for diagnostics purposes.

In the sleep mode 406, the MCM 102 enters sleep mode to save power consumption. At the same time, it will keep the real time clock working to track the rest and operation time of the battery pack.

Figure 9:
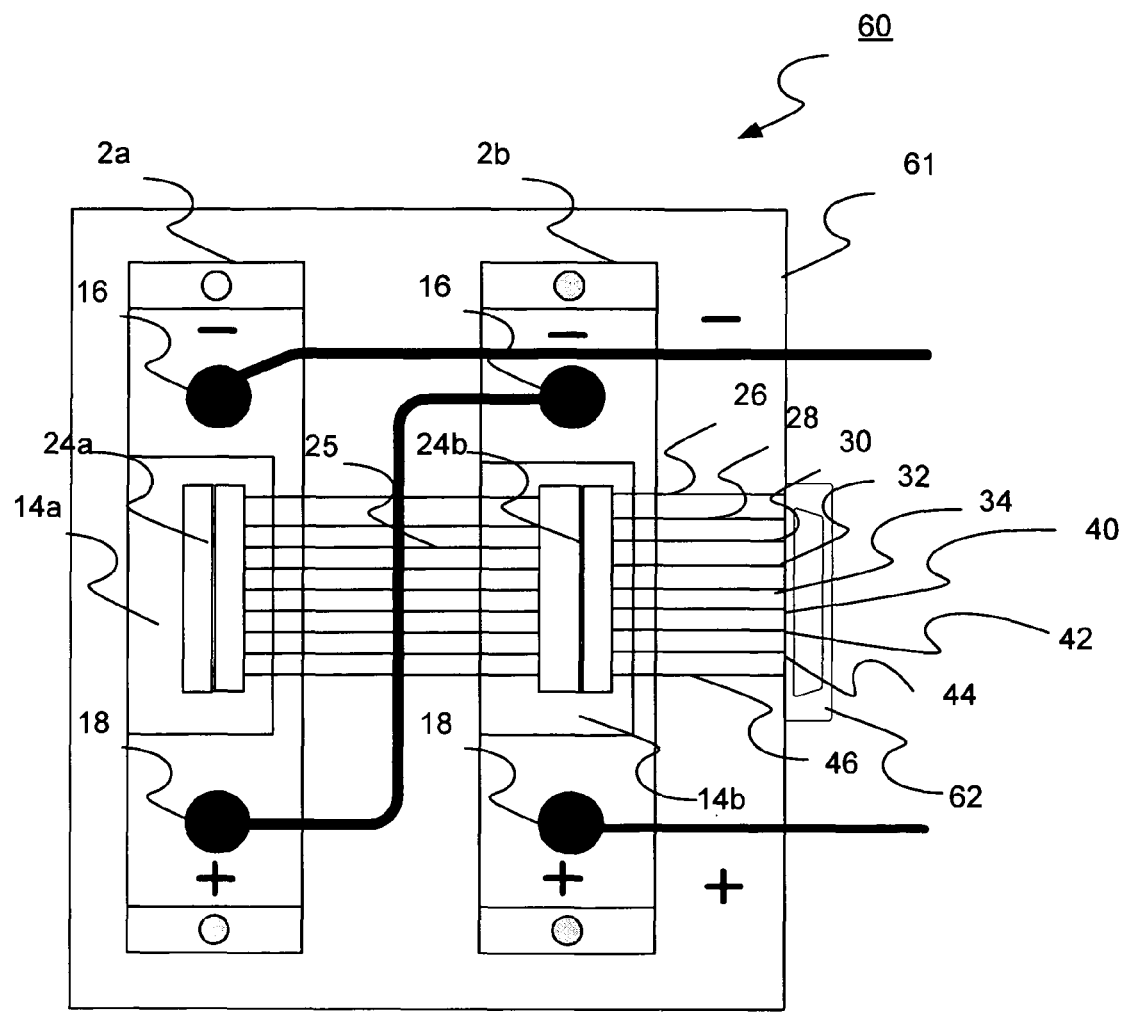
FIG. 9 is a top schematic view of a battery pack having two UBMs that are electrically coupled in series with a MCM.

Referring now to FIG. 9, a battery pack 60 is shown having two UBMs 2*a* and 2*b* that are electrically coupled in series. Such a battery pack 60 is suitable for low voltage applications, such as All-Terrain-Vehicles (ATVs), golf carts, or scooters for the physically challenged. As shown in FIG. 9, the battery pack 60 includes UBMs 2a, 2b having BCU 14a, 14b, respectively. BCU 14a and 14b communicate with each other through connectors 24a, 24b through a serial communication bus 25. The BCU 14b uses its standard control outputs to provide basic control of the UBMs 2a, 2b. A connector 62 is electrically connected with connector 24b to communicate control signals from the UBM 2b to an external bus (not shown). For low voltage low cost applications such as ATVs, an external bus is typically not present. In these applications, there may be no external serial bus communication during operation except for services such as diagnostics, software update, calibration update, etc. by connecting an external controller such as a Personal Computer equipped with a CAN card to the CAN1 bus 113. In the presently described embodiment, the CAN communication terminals 26 and 28 are used for service operation control only, and include software or parameter upload/download and system reset. The power on signals (Ignition 30 and GND 40) are the operation control signals with Diff IN+ 44, and Diff IN− 46 indicating the pack 60 current.

Although in most low voltage applications the operational temperature of the battery pack 60 does not reach critical levels, a heat sink (not shown) can optionally be thermally coupled to the battery pack shell 61 which thermally contacts tightly with battery module base plates to improve heat dissipation.

Figure 10:
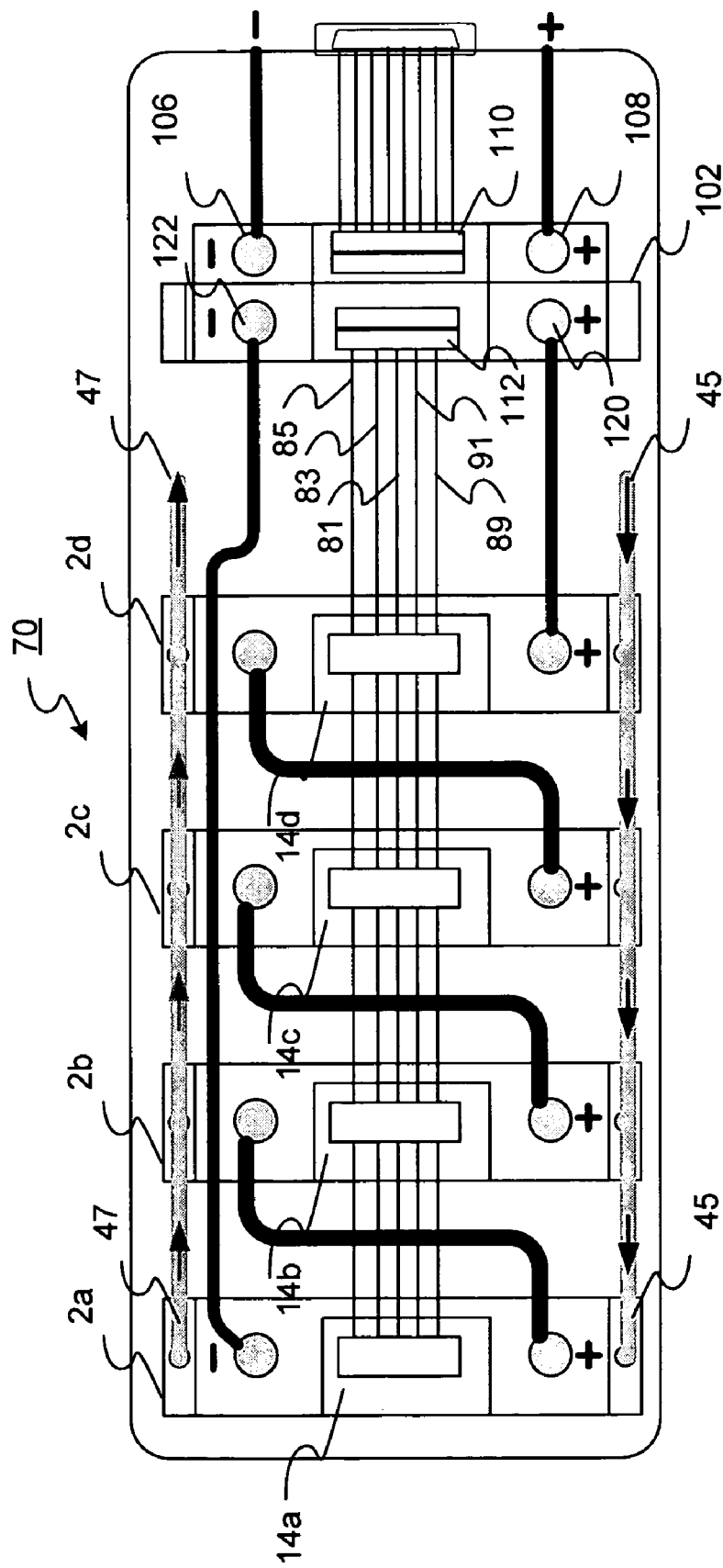
FIG. 10 is a top schematic view of a battery pack having four UBMs that are electrically coupled in series with no MCM.

FIG. 10 shows a perspective view of a battery pack 70 having four UBMs 2a, 2b, 2c, and 2d that are electrically coupled in series, having BCU 14a, 14b, 14c, and 14d, respectively. The battery pack 70 is a high voltage pack that requires a MCM 102 to provide high voltage protections and battery pack power on/off control. It is suitable for high power applications, such as pure electric vehicles, hybrid electric vehicles, wind or solar energy storages. All the BUCs 14a, 14b, 14c, and 14d communicate with each other using the CAN2 bus 83, 81.

The MCM 102 has its input power terminals 120 and 122 connected to the power terminals 18d and 16d of UBM 14d respectively. The MCM 102 output power terminals 108 and 106 are the battery pack's 70 power interface. The MCM 102 communicates with the external devices such as the power control system 3 in FIG. 1(a) via connector 110 which has the same signals as those described in Table 2.

Within the pack 70, the MCM 102 interfaces with UBM 2d by internal electric connector 112 with signals include: (i) Sequence enable 85; (ii) CAN+ 83; (iii) CAN− 81; (iv) Power On/Off 91; and (v) Signal ground 89. With MCM 102 to manage the pack 70 and to provide battery pack control, UBMs' 2a to 2d system control signals such as those described in Table 1 namely the warning light 32, power control 34, contactor control 42, Diff IN+ 44, and Diff IN− 46 are not required and therefore will not be connected and used.

For high power applications, the battery pack 70 requires liquid cooling with coolant in 45 and coolant out 47 for the purpose of both thermal cooling and thermal equalization between the UBMs 2a to 2d.

Figure 11:
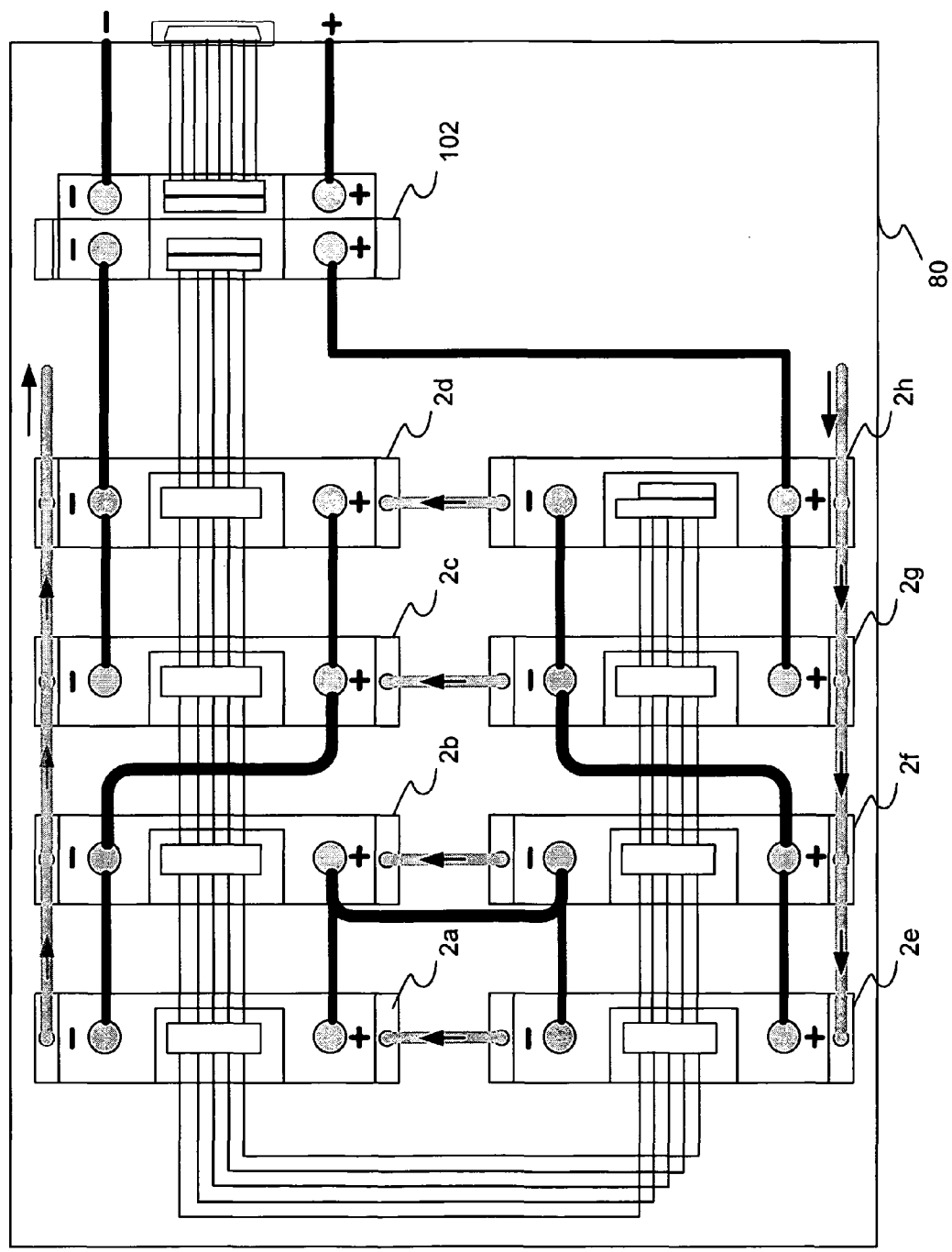
FIG. 11 is a top schematic view of a battery pack that includes an array of UBMs, wherein two rows of four UBMs are positioned side-by-side.

In the above examples, each battery pack comprises a single linear array of UBMs in series. However, alternative arrangements of UBMs are also possible. As shown in the exemplary embodiment of FIG. 11, the battery pack 80 includes an array of UBMs 2a to 2h, wherein two rows of four UBMs 2a to 2d, and 2e to 2h are retained side-by-side. The UBMs 2a to 2h of each row are aligned proximate to each other with their respective inlets 10a to 10h and outlets 12a to 12h are in alignment to permits improved flow of coolant within the cooling system. The UBMs 2a to 2d are connected to one another in parallel. Similarly, the UBMs 2e to 2h are connected to one another in parallel. The UBMs 2a to 2d in the first row are connected to the UBMs 2e to 2h in the second row in series. The UBM 2d is connected to a MCM 102, which is responsible for controlling the entire battery pack 80.

It is obvious that the foregoing embodiments of the invention are exemplary and can be varied in many ways. Such present or future variations are not to be regarded as a departure from the spirit and scope of the invention, and all such modifications as would be obvious to one skilled in the art are intended to be included within the scope of the following claims.

I claim:

1. A universal battery module configured as a generic building block for a battery pack, said battery pack including a plurality of universal battery modules, each universal battery module comprising:
   a plurality of electrically connected battery cells;
   sensor means coupled to the cells, the sensor means configured to transmit physical parameters of the cells; and
   a battery control unit in communication with the sensor means to control the cells based on physical parameters from the sensor means, the battery control unit configured in serial communication with other universal battery modules in the battery pack to provide control signals directly to the other universal battery modules and receive control signals directly from the other universal battery modules, the battery control unit further configured to be responsive to an input signal wherein the input signal is configured to assign system control of the battery pack to one universal battery module of the plurality of universal battery modules in the battery pack, and wherein the battery control unit is configured to control all of the plurality of universal battery modules of the battery pack when assigned system control of the battery pack;
   wherein the battery control unit, the sensor means and the cells are packaged together as a single integral module and wherein the universal battery module is configured for interchangeability within the battery pack.

2. The universal battery module as set forth in claim 1, further comprising a shell for retaining the battery cells therein.

3. The universal battery module as set forth in claim 1, further comprising a thermal frame in thermal communication with the cells to provide cell thermal equalization.

4. The universal battery module as set forth in claim 2, further comprising a base plate coupled to the shell in a hermetically sealing relationship and in thermal communication with a thermal frame to enhance heat dissipation from the thermal frame.

5. The universal battery module as set forth in claim 4, wherein the base plate has an inlet, an outlet and a plurality of passes fluidly connected to the inlet and outlet for transmitting cooling liquid between the inlet and the outlet.

6. The universal battery module as set forth in claim 4, wherein the base plate is hermetically coupled to the shell in a sealing relationship.

7. The universal battery module as set forth in claim 1, further comprising cell electric equalization means.

8. The universal battery module as set forth in claim 1, further comprising an electrical connector coupled to the battery control unit, the electrical connector being configured to provide electric connections for serial communication, power on/off signal, control output signals and input signals.

9. The universal battery module as set forth in claim 8, wherein a serial communication bus is a CAN bus.

10. The universal battery module as set forth in claim 1, wherein the battery control unit is configured to generate control output signals relating to charge/discharge power control and warning light control.

11. The universal battery module as set forth in claim 1, wherein the battery control unit is configured to monitor a module current from differential input signals.

12. The universal battery module as set forth in claim 1, wherein the battery control unit is configured to monitor cell voltages, module current and module thermal frame temperature.

13. The universal battery module as set forth in claim 1, wherein the battery control unit is configured to control the cell electrical equalization.

14. The universal battery module as set forth in claim 1, wherein the battery control unit is configured to control arbitration of sequence numbers of the universal battery modules in the battery pack.

15. The universal battery module as set forth in claim 14, wherein arbitration enables automatic numbering of each of the universal battery modules in the battery pack.

16. The universal battery module as set forth in claim 14, wherein the arbitration of the sequence numbers determines the universal battery module which will provide battery pack control.

17. The universal battery module as set forth in claim 14, wherein arbitration is initiated upon first time power up.

18. The universal battery module as set forth in claim 14, wherein arbitration is initiated upon an external service reset command.

* * * * *

UNITED STATES PATENT AND TRADEMARK OFFICE
CERTIFICATE OF CORRECTION

PATENT NO.       : 7,772,799 B2                                         Page 1 of 1
APPLICATION NO.  : 11/348056
DATED            : August 10, 2010
INVENTOR(S)      : Deping Wu It is certified that error appears in the above-identified patent and that said Letters Patent is hereby corrected as shown below:

Column 10:
Line 53, "sa described" should read --as described--

Signed and Sealed this

Sixteenth Day of November, 2010

David J. Kappos
*Director of the United States Patent and Trademark Office*